(12) United States Patent
Kurihara

(10) Patent No.: US 10,913,838 B2
(45) Date of Patent: Feb. 9, 2021

(54) METHOD FOR PRODUCING TIRE SIDEWALL RUBBER MEMBER

(71) Applicant: Toyo Tire Corporation, Itami (JP)

(72) Inventor: Akie Kurihara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 36 days.

(21) Appl. No.: 16/330,949

(22) PCT Filed: Sep. 27, 2017

(86) PCT No.: PCT/JP2017/034970
§ 371 (c)(1),
(2) Date: Mar. 6, 2019

(87) PCT Pub. No.: WO2018/070249
PCT Pub. Date: Apr. 19, 2018

(65) Prior Publication Data
US 2019/0211190 A1  Jul. 11, 2019

(30) Foreign Application Priority Data

Oct. 14, 2016  (JP) .................... 2016-202886

(51) Int. Cl.

| | |
|---|---|
| C08L 7/00 | (2006.01) |
| C08L 9/00 | (2006.01) |
| C08J 3/22 | (2006.01) |
| B60C 1/00 | (2006.01) |
| B32B 7/00 | (2019.01) |
| B29B 7/00 | (2006.01) |
| C08K 3/06 | (2006.01) |
| C08K 5/20 | (2006.01) |
| C08K 5/098 | (2006.01) |
| C08L 91/06 | (2006.01) |
| C08K 3/22 | (2006.01) |
| C08J 3/20 | (2006.01) |
| C08K 5/09 | (2006.01) |
| C08K 5/101 | (2006.01) |
| C08K 3/04 | (2006.01) |
| B29L 30/00 | (2006.01) |

(52) U.S. Cl.
CPC .............. *C08L 7/00* (2013.01); *B29B 7/005* (2013.01); *B60C 1/00* (2013.01); *B60C 1/0025* (2013.01); *C08J 3/20* (2013.01); *C08J 3/226* (2013.01); *C08K 3/04* (2013.01); *C08K 3/06* (2013.01); *C08K 3/22* (2013.01); *C08K 5/09* (2013.01); *C08K 5/098* (2013.01); *C08K 5/101* (2013.01); *C08K 5/20* (2013.01); *C08L 9/00* (2013.01); *C08L 91/06* (2013.01); *B29L 2030/007* (2013.01); *C08L 2205/025* (2013.01); *C08L 2205/03* (2013.01); *C08L 2205/035* (2013.01); *C08L 2205/06* (2013.01); *C08L 2310/00* (2013.01)

(58) Field of Classification Search
CPC ...... C08L 7/00; C08L 9/00; C08J 3/22; B60C 1/00; B29B 7/00
USPC ........................................... 524/62
See application file for complete search history.

(56) References Cited

U.S. PATENT DOCUMENTS

| | | | |
|---|---|---|---|
| 2014/0020808 A1* | 1/2014 | Watanabe | ............ B60C 1/0025 152/525 |
| 2014/0124113 A1 | 5/2014 | Miyazaki et al. | |
| 2014/0128531 A1* | 5/2014 | Miyazaki | ............ B60C 1/0016 524/496 |
| 2015/0251992 A1* | 9/2015 | Watanabe | ............... C08K 5/17 562/433 |

FOREIGN PATENT DOCUMENTS

| | | |
|---|---|---|
| JP | 2008-150435 A | 7/2008 |
| JP | 2012-21083 A | 2/2012 |

(Continued)

OTHER PUBLICATIONS

International Search Report dated Dec. 19, 2017, issued in counterpart International Application No. PCT/JP2017/034970 (2 pages).

*Primary Examiner* — Deve V Hall
(74) *Attorney, Agent, or Firm* — Westerman, Hattori, Daniels & Adrian, LLP

(57) ABSTRACT

A method for producing a tire sidewall rubber member according to an embodiment comprises: a first kneading step of preparing a first kneaded product by kneading a diene rubber, carbon black, a compound represented by formula (I) (wherein $R^1$ and $R^2$ represent a hydrogen atom, an alkyl group, an alkenyl group or an alkynyl group, and $M^+$ is $Na^+$, $K^+$ or $Li^+$), and zinc oxide; and a second kneading step of adding wax and/or stearic acid to the first kneaded product, followed by kneading. Thus, low heat generation properties are improved while suppressing the deterioration of tear resistance.

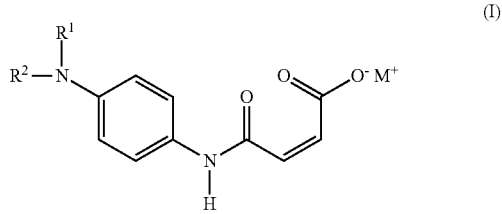

7 Claims, 1 Drawing Sheet

(56) References Cited

FOREIGN PATENT DOCUMENTS

| | | | |
|---|---|---|---|
| JP | 2013-155305 | A | 8/2013 |
| JP | 2013-209605 | A | 10/2013 |
| JP | 2014-95014 | A | 5/2014 |
| JP | 2014-95015 | A | 5/2014 |
| JP | 2014-95019 | A | 5/2014 |
| JP | 2014-210830 | * | 11/2014 |
| JP | 2016-41777 | A | 3/2016 |
| JP | 2016-160353 | A | 9/2016 |
| WO | WO2012147984 | * | 11/2012 |

* cited by examiner

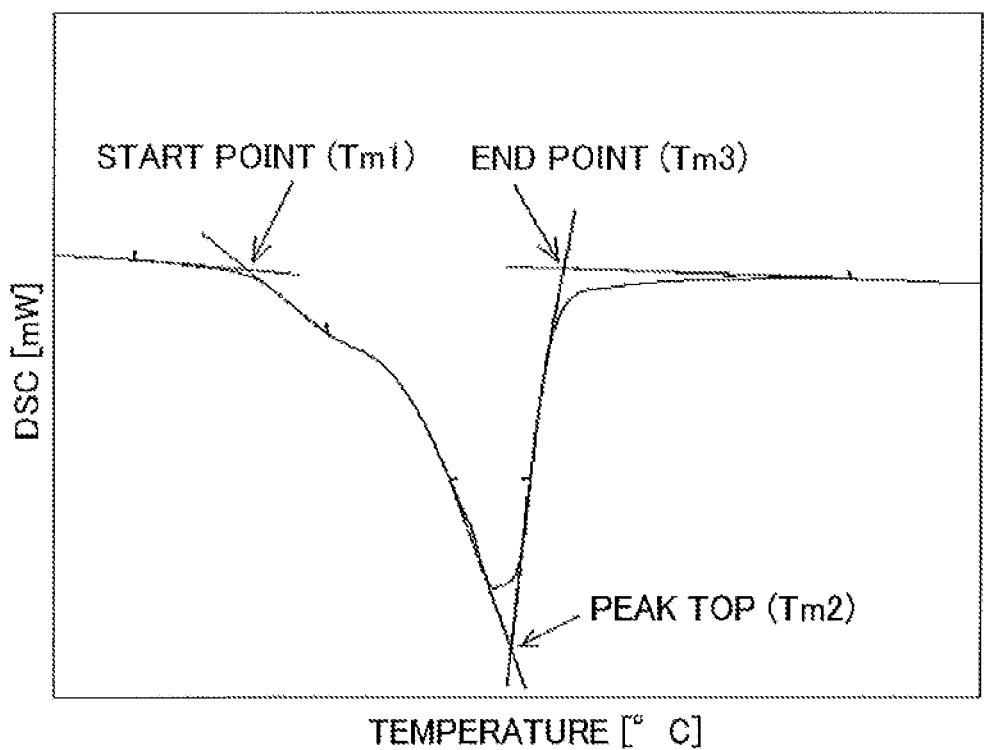

METHOD FOR PRODUCING TIRE SIDEWALL RUBBER MEMBER

TECHNICAL FIELD

An embodiment of the present invention relates to a method for producing a sidewall rubber member constituting a sidewall part of a pneumatic tire and a method for manufacturing a pneumatic tire using the sidewall rubber member.

BACKGROUND ART

To improve low fuel consumption of a pneumatic tire, a rubber compound having low heat generation properties is used in not only a tread part but a sidewall part. For example, to improve low heat generation properties in a rubber composition for a sidewall, addition of (2Z)-4-[(4-aminophenyl)amino]-4-oxo-2-butenoic acid salt is proposed (see Patent Literatures 1 and 2). This compound is bonded to carbon black and is also bonded to a diene rubber. Therefore, dispersibility of carbon black is improved, thereby low heat generation properties can be improved.

Patent Literature 2 discloses to prepare a rubber composition by previously kneading this compound together with a diene rubber and carbon black to prepare a masterbatch and adding other components to the masterbatch, followed by kneading. Furthermore, although the technology relating a rubber composition for a tread, Patent Literature 3 discloses that the inhibition of a coupling reaction by masking carbon black with other compound ingredients is suppressed by forming a masterbatch of this compound together with an isoprene rubber and carbon black.

Addition of a processing aid such as fatty acid metal salt or fatty acid amide to a rubber composition is conventionally known (see Patent Literature 4). However, the processing aid is generally added to a silica-added rubber composition in which the silica was used as a main reinforcing filler. In other words, the silica-added rubber composition generally has high viscosity when adding the silica, leading to the deterioration of workability. Therefore, to decrease the viscosity and improve workability, a fatty acid type processing aid such as fatty acid amide is added. On the other hand, workability as in silica does not become a problem in a carbon black-added rubber composition. Therefore, a processing aid is not generally added in the carbon black-added rubber composition.

CITATION LIST

Patent Literature

Patent Literature 1: JP-A-2014-095019
Patent Literature 2: JP-A-2014-095015
Patent Literature 3: JP-A-2014-095014
Patent Literature 4: JP-A-2008-150435

SUMMARY OF THE INVENTION

Problems that the Invention is to Solve

The compounds described in Patent literatures 1 to 3 improve dispersibility of carbon black, thereby low heat generation properties can be improved. However, according to the present inventor's investigations, it was clarified that tear resistance is deteriorated.

In view of the above, an embodiment of the present invention has an object to provide a method for producing a the sidewall rubber member that can improve low heat generation properties while suppressing the deterioration of tear resistance.

Means for Solving the Problems

The method for producing a tire sidewall rubber member according to this embodiment comprises first kneading step of preparing a first kneaded product by kneading a diene rubber, carbon black, a compound represented by the following formula (I) and zinc oxide, and a second kneading step of adding wax and/or stearic acid to the first kneaded product, followed by kneading.

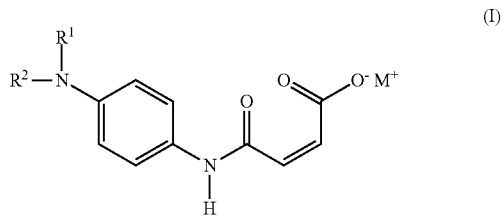

In the formula (I), $R^1$ and $R^2$ represent a hydrogen atom, an alkyl group having 1 to 20 carbon atoms, an alkenyl group having 1 to 20 carbon atoms or an alkynyl group having 1 to 20 carbon atoms, and $R^1$ and $R^2$ may be the same or different. $M^+$ represents a sodium ion, a potassium ion or a lithium ion.

The method for producing a pneumatic tire according to this embodiment comprises manufacturing a green tire having a sidewall rubber member obtained by the production method described above and vulcanization-molding the green tire.

Effects of the Invention

According to this embodiment, low heat generation properties are improved and additionally deterioration of tear resistance can be suppressed, by previously kneading the compound of the formula (I) together with a diene rubber, carbon black and zinc oxide.

BRIEF DESCRIPTION OF THE DRAWINGS

FIG. 1 is a view showing a start point (Tm1) and an end point (Tm3) of an endothermic peak in a differential calorie curve measured by a differential scanning calorimeter.

MODE FOR CARRYING OUT THE INVENTION

The items relating to the embodiment of the present invention are described in detail below.

The method for producing a tire sidewall rubber member according to this embodiment is that in preparing a rubber composition, (A) a diene rubber, (B) carbon black, (C) the compound represented by the formula (I) and (D) zinc oxide are kneaded to prepare a first kneaded product in a first mixing step and (E) wax and/or stearic acid are added to the first kneaded product, followed by kneading in a second kneading step. The compound of the formula (I) can improve dispersibility of carbon black and can improve low heat generation properties, by that an end amino group is reacted with a functional group on the surface of carbon black and a carbon-carbon double bond moiety is bonded to the diene rubber. When this compound is previously kneaded together with the diene rubber and carbon black, the reaction becomes dense than the general kneading and as a result, low heat generation properties can be further improved. Furthermore, in such a case, by previously kneading zinc oxide, tear resistance can be improved by an interaction between the compound of the formula (I) and zinc oxide.

(A) Diene Rubber

In this embodiment, examples of the diene rubber as a rubber component include natural rubber (NR), isoprene rubber (IR), butadiene rubber (BR), styrene-butadiene rubber (SBR), styrene-isoprene rubber, butadiene-isoprene rubber, styrene-butadiene-isoprene rubber and nitrile rubber (NBR). Those rubbers can be used alone or as mixtures of two or more kinds. The diene rubber is more preferably at least one selected from the group consisting of natural rubber, isoprene rubber, styrene-butadiene rubber and butadiene rubber.

In one embodiment, 100 parts by mass of the diene rubber preferably contain 30 to 80 parts by mass of natural rubber and/or isoprene rubber and 70 to 20 parts by mass of butadiene rubber and more preferably contain 40 to 70 parts by mass of natural rubber and/or isoprene rubber and 60 to 30 parts by mass of butadiene rubber.

The butadiene rubber (that is, polybutadiene rubber) is not particularly limited, and examples thereof include (A1) high cis-butadiene rubber, (A2) syndiotactic crystal-containing butadiene rubber and (A3) modified butadiene rubber. Those can be used in any one kind or as mixtures of two or more kinds.

Example of the high cis-BR (A1) includes butadiene rubber having a cis content (that is, cis-1,4-bond content) of 90 mass % or more (preferably 95 mass % or more), and examples thereof include a cobalt type butadiene rubber polymerized using a cobalt catalyst, a nickel type butadiene rubber polymerized using a nickel catalyst and a rare earth type butadiene rubber polymerized using a rare earth element catalyst. The rare earth type butadiene rubber is preferably a neodymium type butadiene rubber polymerized using a neodymium catalyst, and the neodymium type butadiene rubber having a cis content of 96 mass % or more and a vinyl content (that is, 1,2-vinyl bond content) of less than 1.0 mass % (preferably 0.8 mass % or less) is preferably used. The use of the rare earth type butadiene rubber is advantageous to the improvement of low heat generation properties. The cis content and vinyl content are values calculated by an integration ratio of $^1$H-NMR spectrum. Specific example of the cobalt type BR includes "UBEPOL BR" manufactured by Ube Industries, Ltd. Specific examples of the neodymium type BR include "BUNA CB22" and "BUNA CB25" manufactured by LAXESS.

Butadiene rubber that is a rubber resin composite comprising high cis-butadiene rubber as a matrix and syndiotactic 1,2-polybutadiene crystals (SPB) dispersed therein is used as the syndiotactic crystal-containing butadiene rubber (SPB-containing BR) (A2). The use of the SPB-containing BR is advantageous to the improvement of hardness. The SPB content in the SPB-containing BR is not particularly limited, and for example, may be 2.5 to 30 mass % and may be 10 to 20 mass %. The SPB content in the SPB-containing BR is obtained by measuring a boiling n-hexane insoluble content. Specific example of the SPB-containing BR includes "UBEPOL VCR" manufactured by Ube Industries, Ltd.

Examples of the modified BR (A3) include an amine-modified BR and a tin-modified BR. The use of the modified BR is advantageous to the improvement of low heat generation properties. The modified BR may be an end-modified BR having a functional group introduced in at least one end of a molecular chain of BR, may be a main chain-modified BR having a functional group introduced in the main chain, and may be a main chain and end-modified BR having functional groups introduced in the main chain and the end. Specific example of the modified BR includes "BR 1250H" (amine end-modified BR) manufactured by Zeon Corporation.

In one embodiment, when the high cis-BR (A1) and the SPB-containing BR (A2) are used together; 100 parts by mass of the diene rubber may contain 40 to 70 parts by mass of NR and/or IR, 20 to 40 parts by mass of the high cis-BR and 10 to 30 parts by mass of the SPB-containing BR. When the high cis-BR (A1) and the modified BR (A3) are used together, 100 parts by mass of the diene rubber may contain 40 to 70 parts by mass NR and/or IR, 20 to 40 parts by mass of the high cis-BR and 10 to 30 parts by mass of the modified BR. When the cobalt type BR and the neodymium type BR are used together as the high cis-BR (A1), 100 parts by mass of the diene rubber may contain 40 to 70 parts by mass of NR and/or IR, 20 to 40 parts by mass of the cobalt type BR and 10 to 30 parts by mass of the neodymium type BR.

(B) Carbon Black

In this embodiment, the carbon black is not particularly limited, and for example, carbon black having a nitrogen adsorption specific surface area ($N_2$SA) (JIS K6217-2) of 30 to 129 $m^2$/g is preferably used. Specific examples of the carbon black include ISAF grade (N200 Series), HAF grade (N300 Series), FEF grade (N500 Series) and GPF grade (N100 Series) (all is ASTMA grade). NSSA is more preferably 40 to 100 $m^2$/g and still more preferably 50 to 90 $m^2$/g.

The amount of the carbon black added is not particularly limited. However, from the standpoint of reinforcing properties required in a sidewall part, the amount of the carbon black added is preferably 20 to 80 parts by mass and more preferably 30 to 60 parts by mass, per 100 parts by mass of the diene rubber. The amount may be 40 to 60 parts by mass.

(C) Compound Represented by Formula (I)

The compound represented by the following formula (I) is added to the rubber composition according to this embodiment.

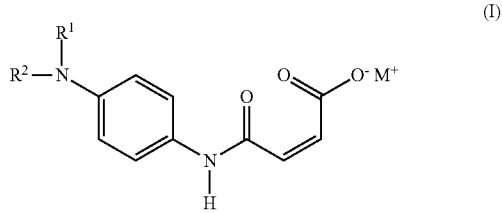

(I)

In the formula (I), $R^1$ and $R^2$ represent a hydrogen atom, an alkyl group having 1 to 20 carbon atoms, an alkenyl group having 1 to 20 carbon atoms or an alkynyl group having 1 to 20 carbon atoms, and $R^1$ and $R^2$ may be the same or different.

Examples of the alkyl group of $R^1$ and $R^2$ include methyl group, ethyl group, n-propyl group, isopropyl group, n-butyl group, sec-butyl group and tert-butyl group. Examples of the alkenyl group of $R^1$ and $R^2$ include vinyl, group, allyl group, 1-propenyl group and 1-methylethenyl group. Examples of the alkynyl group of $R^1$ and $R^2$ include ethynyl group and propargyl group. Those alkyl group, alkenyl group and alkynyl group each have the number of carbon atoms of preferably 1 to 10 and more preferably 1 to 5. $R^1$ and $R^2$ are preferably a hydrogen atom or an alkyl group having 1 to 5 carbon atoms, more preferably a hydrogen atom or methyl group and still more preferably a hydrogen atom. In one embodiment, $-NR^1R^2$ in the formula (I) is preferably $-NH_2$, $-NHCH_3$ or $-N(CH_3)_2$ and more preferably $-NH_2$.

$M^+$ in the formula (I) is a sodium ion, a potassium ion or a lithium ion and is preferably a sodium ion.

The amount of the compound represented by the formula (I) added is hot particularly limited, but is preferably 0.1 to 10 parts by mass and more preferably 0.5 to 8 parts by mass, per 100 parts by mass of the diene rubber. The amount may be 1 to 5 parts by mass. When the amount of the compound represented by the formula (I) added is 0.1 parts by mass or more, the improvement effect of low heat generation properties can be enhanced and when the amount added is 10 parts by mass or less, deterioration of tear resistance can be suppressed.

(D) Zinc Oxide

In this embodiment, zinc oxide (ZnO) is not particularly limited, and can use zinc oxide generally used in a rubber composition for a tire sidewall. The amount of the zinc oxide added is not particularly limited, but is preferably 1 to 10 parts by mass and more preferably 1 to 5 parts by mass, per 100 parts by mass of the diene rubber. The amount may be 2 to 4 parts by mass.

(E) Wax and/or Stearic Acid

Any one or both of wax and stearic acid is added to the rubber composition according to this embodiment. The wax and stearic acid are not particularly limited, and can use those generally used in a rubber composition for a tire sidewall. For example, hydrocarbon waxes such as petroleum wax (paraffin wax or the like), paraffinic synthetic wax and polyolefin was (polyethylene type wax or the like) are preferably used as the wax.

The amount of the wax added is not particularly limited, and may be 0.5 to 10 parts by mass and may be 1 to 5 parts by mass, per 100 parts by mass of the diene rubber. The amount of the stearic acid added is not particularly limited, and may be 0.5 to 10 parts by mass and may be 1 to 5 parts by mass, per 100 parts by mass of the diene rubber.

(F) Fatty Acid Type Processing Aid

Fatty acid type processing aid having specific melting point is preferably added to the lubber composition according to this embodiment. Specifically, a processing aid comprising at least one selected from the group consisting of a fatty acid metal salt, a fatty acid amide and a fatty acid ester and having a difference between a start point (Tm1) and an end point (Tm3) of an endothermic peak measured by a differential scanning calorimeter of 50° C. or more (that is, Tm3−Tm1≥50° C.) may be added. When the fatty acid type processing aid having large difference (Tm3−Tm1) between the start point and the end point of an endothermic peak, that is, having broad distribution, is used, the processing aid is easy to be compatible with the diene rubber that is a polymer having distribution in molecular weight, that is, has good compatibility with the diene rubber. Furthermore, the interaction between the carbon black and the diene rubber is increased by the addition of the compound of the formula (I). As a result, it is considered that tear force is greatly improved.

The difference (Tm3−Tm1) of an endothermic peak of the processing aid is preferably 55° C. or more and more preferably 60° C. or more. The upper limit of the difference (Tm3−Tm1) is not particularly limited. For example, the difference may be 100° C. or less, may be 80° C. or less and may be 70° C. or less. Peak top temperature (Tm2) of an endothermic peak of the processing aid is not particularly limited, but is preferably 60 to 130° C. and more preferably 80 to 120° C.

The start point (Tm1) of an endothermic peak used herein is an endotherm start point (temperature at which fusion starts) of an endothermic peak derived from fusion in a differential calorie curve measured by DSC and is called an onset temperature. In detail, the start point (Tm1) is a temperature at an intersection point of a tangent line of a curve in a depressed portion toward the endotherm side from the endotherm start and a straight line extending a base line at a low temperature side (substantially flat part free of the influence of fusion before endotherm start), in a differential calorie curve as shown in FIG. 1.

The end point (Tm3) of an endothermic peak is an endotherm end point (temperature at which fusion ends) of the endothermic peak and is called an endset temperature. In detail, the end point (Tm3) is a temperature at an intersection point of a tangent line of a curve in a depressed portion toward the endotherm side from the endotherm end and a straight line extending a base line at a high temperature side (substantially flat part after endotherm end), in a differential calorie curve as shown in FIG. 1.

The peak top temperature (Tm2) is the maximum endothermic temperature of the endothermic peak and is a temperature at an intersection point of tangents of curves at both sides reaching the maximum endothermic point as shown in FIG. 1.

A method for preparing the processing aid having the difference (Tm3−Tm1) of an endothermic peak of 50° C. or more is not particularly limited, and examples thereof include a method of broadening a carbon number distribution of the constituent fatty acid and a method of combining at least two selected from a fatty acid metal salt, a fatty acid amide and a fatty acid ester.

The fatty acid of the tatty acid metal salt used as the processing aid is not particularly limited, and examples thereof include saturated fatty acid and/or unsaturated fitly acid, having 5 to 36 carbon atoms. The fatty acid is more preferably saturated fatty acid and/or unsaturated fatty acid, having 8 to 24 carbon atoms. Specific examples of the fatty acid include octanoic acid, capric acid, lauric acid, myristic acid, palmitic acid, stearic acid, arachidic acid, oleic acid, linoleic acid and linolenic acid. Examples of the metal salt include an alkali metal salt such as sodium salt and potassium salt, an alkaline earth metal salt such as magnesium salt and calcium salt, and a transition metal salt such as zinc salt, cobalt salt and copper salt. Of those, an alkali metal salt, and/or an alkaline earth metal salt are preferred, and potassium salt and/or calcium salt are more preferred.

The fatty acid of the fatty acid amide is not particularly limited, and similar to the fatty acid metal salt, examples thereof include saturated fatty acid and or unsaturated fatty acid, having 5 to 36 carbon atoms. The fatty acid is more preferably saturated fatty acid and/or unsaturated fatty acid, having 8 to 24 carbon atoms. The fatty acid amide may be a primary amide such as stearic acid amide and may be a secondary amide or a tertiary amide, obtained by reacting a fatty acid compound with a primary amine or a secondary amine such as monoethanol amine and diethanol amine. Furthermore, the fatty acid amide may be an alkylene bis-fatty acid amide having two fatty acid residues. In the case of the alkylene bis-fatty acid amide, the carbon number of the fatty acid is a carbon number per one amide group. The alkylene is preferably methylene or ethylene. The fatty acid amide is preferably a fatty acid alkanol amide (that is, a fatty acid alkanol amine salt) and more preferably fatty acid ethanol amide.

The fatty acid of the fatty acid ester is not particularly limited, and similar to the fatty acid metal salt, examples thereof include saturated fatty acid and/or unsaturated fatty acid, having 5 to 36 carbon atoms. The fatty acid is more preferably saturated fatty acid and/or unsaturated fatty acid, having 8 to 24 carbon atoms. The alcohol of the fatty acid esters is not particularly limited, and examples thereof include, a monohydric alcohol such as methanol, ethanol, propanol and butanol, and further include a di- or more hydric alcohol such as glycol, glycerin, erythritol and sorbitol.

A mixture of (F1) a fatty acid metal salt and (F2) a fatty acid amide and/or a fatty acid ester (a fatty acid amide and a fatty acid ester are hereinafter collectively referred to as a fatty acid derivative) is preferably used as the processing aid. The fatty acid amide is more preferably used as the fatty acid derivative (F2). The ratio between the fatty acid metal salt (F1) and the fatty acid derivative (F2) is not particularly limited, but is preferably F1/F2=2/8 to 8/2 in mass ratio.

The amount of the processing aid added is preferably 0.5 to 10 parts by mass and more preferably 1 to 8 parts by mass, per 100 parts by mass of the diene rubber. The amount may be 2 to 5 parts by mass. When the amount of the processing aid added is 0.5 parts by mass or more, tear resistance can be improved and when the amount is 10 parts by mass or less, tear resistance can be improved without influence to other properties.

(G) Vulcanizing Agent

A vulcanizing agent is added to the rubber composition according to this embodiment. Examples of the vulcanizing agent is not particularly limited, but examples thereof include powdered sulfur, precipitated sulfur, colloidal sulfur, insoluble sulfur and highly dispersible sulfur. Those can be used alone or as mixtures of two or more kinds. The amount of the vulcanizing agent added may be 0.1 to 10 parts by mass and may be 0.5 to 5 parts by mass, per 100 parts by mass of the diene rubber.

(H) Other Compounding Ingredients

In addition to the above components, various additives generally used in a rubber composition for a sidewall rubber member of a tire, such as other reinforcing fillers (such as silica, an age resister, oil and a vulcanization accelerator, can be added to the rubber composition according to this embodiment.

In this embodiment, carbon black is preferably used as a main component of the reinforcing filler. Specifically the reinforcing filler preferably contains carbon black in an amount of 75 mass % or more (more preferably 80 mass % or more) based on the total amount of the reinforcing filler. For this reason, the reinforcing filler may be carbon black alone and may contain 75 mass % or more of carbon black and a small amount (that is, 25 mass % or less) of silica. The amount of the reinforcing filler added is not particularly limited. However, from the standpoint of reinforcing properties required in a sidewall part, the amount is preferably 20 to 100 parts by mass and more preferably 30 to 80 parts by mass, per 100 parts by mass of the diene rubber. The amount may be 40 to 60 parts by mass. The amount of silica added is preferably 20 parts by mass or less and more preferably 10 parts by mass or less, per 100 parts by mass of the diene rubber.

In this embodiment, the vulcanization accelerator is not particularly limited, and examples thereof include sulfonamide type, thiuram type, guanidine type, thiazole type and thiourea type. Those can be used in one kind or as mixtures of two or more kinds. Sulfanamide type such as N-cyclohxyl-2-benzothiazolyl sulfonamide (CBS) or N-tert-butyl-2-benzothiazolylsulfonamide (BBS) is preferably used. The amount of the vulcanization, accelerator added is preferably 0.1 to 7 parts by mass and more preferably 0.5 to 5 parts by mass, per 100 parts by mass of the diene rubber.

Production and Manufacturing Methods of Sidewall Rubber Member and Tire

The method for producing a sidewall rubber member according to this embodiment includes, as steps for preparing its rubber composition, (1) a first kneading step of kneading a diene rubber, carbon black, the compound represented by the following formula (I) and zinc oxide to prepare a first kneaded product, and (2) a second kneading step of adding wax and/or stearic acid to the first kneaded product obtained followed by kneading, thereby preparing a second kneaded product.

In a preferred embodiment, the method may further includes, in addition to the above first kneading step and second kneading step, (3) a third kneading step of adding a vulcanizing agent to the second kneaded product obtained in the second kneading step, followed by kneading, to obtain a rubber composition.

In this case, the first kneading step and second kneading step are a nonproductive mixing step, and the third kneading step is a productive mixing step. The first kneading step may be a nonproductive mixing step, the second kneading step may be a productive mixing step, and a vulcanizing agent may be added together with additives such as wax and/or stearic acid, followed by kneading, in the second kneading step.

In the first kneading step, 100 parts by mass of the diene rubber, 20 to 80 parts by mass of carbon black, 0.1 to 10 parts by mass of the compound of the formula (I) and 1 to 10 parts by mass of zinc oxide are preferably kneaded. More preferably, the respective whole amounts of the diene rubber, carbon black, the compound of the formula (I) and zinc oxide to be added to a rubber composition are preferably introduced and kneaded in the first kneading step. The reason for this is that a coupling reaction between the diene rubber and carbon black by the compound of the formula (I) is accelerated, thereby improving low heat generation properties and additionally the improvement effect of tear resistance by an interaction between the compound of the formula (I) and zinc oxide is enhanced. For this reason, components other than those are not preferably added in the first kneading step. In other words, in the first kneading step according to the preferred embodiment, only the diene rubber, carbon black, the compound of the formula (I) and zinc oxide are kneaded and other components are not kneaded.

In the second kneading step, wax and/or stearic acid are added to the first kneaded product. Those components may inhibit the coupling reaction by carbon black. Therefore, those components are not added in the first kneading step and are added in the second kneading step.

In the second kneading step, the fatty acid type processing aid is preferably added and kneaded together with wax and/or stearic acid. Tear resistance can be further enhanced by adding the fatty acid type processing aid.

The amounts of the wax, stearic acid and fatty acid type processing aid in the second kneading step are preferably that the wax is 0.5 to 10 parts by mass, the stearic acid is 0.5 to 10 parts by mass and the fatty acid type processing aid is 0.5 to 10 parts by mass, per 100 parts by mass of the diene rubber contained in the first kneaded product. The respective whole amounts of the wax, stearic acid and fatty acid type processing aid to be added to the rubber composition are preferably added and kneaded in the second step.

In the second kneading step, other reinforcing fillers (such as silica), an age resister, oil and the like may be added and kneaded together with the wax, stearic acid and fatty acid type processing aid. Furthermore, when the second kneading step is a productive mixing step as described above, a vulcanizing agent and a vulcanization accelerator may be further added and kneaded.

In the third kneading step, a vulcanizing agent is added to the second kneaded product, followed by kneading. In general, a vulcanization accelerator is added and kneaded together with the vulcanizing agent. The amounts of the vulcanizing agent and vulcanization accelerator added in the third kneading step are preferably that the vulcanizing agent is 0.1 to 10 parts by mass and the vulcanization accelerator is 0.1 to 7 parts by mass, per 100 parts by mass of the diene rubber contained in the second kneaded product. Preferably, the respective whole amounts of the vulcanizing agent and vulcanization accelerator to be added to the rubber composition are added and kneaded in the third kneading step.

The nonproductive mixing step (the first kneading step and the second kneading step when a vulcanizing agent is not used) can be carried out using a mixing machine such as Banbury mixer, a kneader or rolls. Each component described above is put in the mixing machine, kneading as dry mixing to which mechanical shear force has been applied is conducted, and the resulting kneaded product (nonproductive rubber mixture) is discharged from the mixing machine at a predetermined discharge temperature. The upper limit of the kneading temperature in the nonproductive mixing step (that is, discharge temperature from a mixing machine) is not particularly limited. For example, the upper limit may be 130 to 180° C. and may be 140 to 180° C.

The productive mixing step (the third kneading step and the second kneading step when a vulcanizing agent is used) can be carried out using a mixing machine such as open rolls or Banbury mixer. The vulcanizing agent, the vulcanization accelerator and the like are put in the mixing machine together with the nonproductive rubber mixture, kneading is conducted and the resulting kneaded product is discharged from the mixing machine at a predetermined discharge temperature. To suppress the reaction of the vulcanizing agent and vulcanization accelerator, the discharge temperature in the productive mixing step is, for example, preferably 80 to 120° C. and more preferably 90 to 110° C.

The method for producing a side wall rubber member according to this embodiment further includes a molding step of molding an unvulcanized sidewall rubber member using the rubber composition obtained above. The step of molding an unvulcanized sidewall rubber member from a rubber composition is well known, and the rubber composition can be molded using the conventional method. For example, the rubber composition is extrusion-molded into a predetermined cross-sectional shape corresponding to a sidewall part. Alternatively, a ribbon-shaped rubber strip comprising the rubber composition is spirally wound on a drum to form into a cross-sectional shape corresponding to a sidewall part. Thus, an unvulcanized sidewall rubber member can be obtained.

The method for manufacturing a pneumatic tire according to this embodiment comprises a step of manufacturing a green tire having the sidewall rubber member obtained above and a step of vulcanization-molding the green tire. In detail, the sidewall rubber member is fabricated into a tire shape together with other tire members constituting a tire such as an inner liner, a carcass, a belt, a bead core, a bead filler and a tread rubber according to the conventional method to manufacture a green tire (unvulcanized tire). The green tire thus obtained is, for example, set to a mold and vulcanization-molded at 140 to 180° C. according to the conventional method. Thus, a pneumatic tire having a sidewall part formed from the sidewall rubber member is obtained. The above manufacturing a green tire and vulcanization molding a tire can be conducted using the conventional method and are not particularly limited.

The kind of the pneumatic tire according to this embodiment is not particularly limited, and examples of the pneumatic tire include various tires such as tires for passenger cars and heavy load tires used in trucks, buses and the like.

EXAMPLES

Examples of the present invention are described below, but the present invention is not construed as being limited to those examples.

First Example

Each rubber composition to be used as a sidewall rubber member was prepared according to the formulations (parts by mass) shown in Table 1 below using Banbury miser (manufactured by Kobe Steel, Ltd.).

In detail, in step 1 (first kneading step) as a premixing in Examples 1 to 7 and Comparative Examples 3 to 6, the respective components shown in the column of step 1 were kneaded by Banbury mixer and the resulting kneaded product was discharged at a discharge temperature of 160° C. and then allowed to stand at room temperature to obtain a masterbatch (first kneaded product). In step 2 (second kneading step), the respective components shown in the column of step 2 was put in Banbury mixer together with the masterbatch, followed by kneaded. The resulting kneaded product was discharged at a discharge temperature of 160° C. and then allowed to stand at room temperature to obtain a second kneaded product. In step 3 (third kneading step), the respective components shown in the column of step 3 was put in Banbury mixer together with the second kneaded product, followed by kneading. The resulting kneaded product was discharged at a discharge temperature of 110° C. to obtain a rubber composition.

In the nonproductive mixing step in Comparative Examples 1 and 2, the respective components shown in the column of step 2 without premising were put in Banbury mixer and kneaded. The resulting kneaded product was discharged at a discharge temperature of 160° C. and then allowed to stand at room temperature. In a productive mixing step, the kneaded product obtained was put in Banbury mixer together with the respective components shown in the column of step 3, followed by kneading. The resulting kneaded product was discharged at a discharge temperature of 110° C. to obtain a rubber composition.

The masterbatch may be prepared using, for example, Labomixer (manufactured by Nikko Co., Ltd.) or Laboplast mill (manufactured by Kobe Steel, Ltd.), other than Banbury mixer (manufactured by Kobe Steel, Ltd.). The details of each component in Table 1 are as follows.

Natural rubber: RSS #3

BR 1: Cobalt type BR, "UBEPOL BR150" (cis content=98 mass %) manufactured by Ube Industries. Ltd.

Carbon black: HAF, "SEAST 3" ($N_2SA$=79 $m^2$/g) manufactured by Tokai Carbon Co., Ltd.

Zinc oxide: "Zinc Oxide #1" manufactured by Mitsui Mining & Smelting Co., Ltd.

Wax: "OZOACE 0355" manufactured by Nippon Seiro Co., Ltd.

Stearic acid: "Industrial Stearic Acid" manufactured by Kao Corporation

Sulfur: "5% Oil-Treated Powdered Sulfur" manufactured by Tsurumi Chemical Industry Co., Ltd.

Vulcanization accelerator: "NOCCELER NS-P" manufactured by Ouchi Shinko Chemical Industrial Co., Ltd.

Processing aid 1: "AFLUX 16" (mixture of 50% fatty acid calcium salt and 50% fatty acid ethanol amide, Tm1=53° C. Tm2=113° C., Tm3=120° C., Tm3−Tm1=67° C.) manufactured by Rhein Chemie Processing aid 2: "ULTRA FLOW 160" (mixture of fatty acid calcium salt and fatty acid amide, Tm1=61° C., Tm2=99° C., Tm3=113° C., Tm3−Tm1=52° C.) manufactured by PERFORMANCE ADDITIVE Processing aid 3: "ULTRA FLOW 500" (fatty acid zinc salt, Tm1=81° C., Tm2=108° C., Tm3=114° C., Tm3−Tm1=33° C.) manufactured by PERFORMANCE ADDITIVE Processing aid 4: "DIAMID BH" (fatty acid amide, Tm1=111° C., Tm2=113° C., Tm3=118° C., Tm3−Tm1=7° C.) manufactured by Nihon Kasei Chemical Co., Ltd.

Compound (I): (2Z)-4-[(4-aminophenyl)amino]-4-oxo-2-butenoic acid sodium salt (compound represented by the following formula (I')) manufactured by Sumitomo Chemical Co., Ltd.

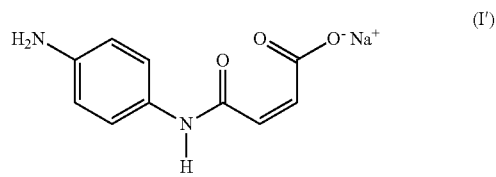

Tm1, Tm2 and Tm3 of the processing aid were measured using "DSC 8220" manufactured by METTLER TOLEDO. Temperature was increased from 23° C. to 250° C. in a temperature rising rate of 10K/min in air to obtain a differential calorie curve, and the following Tm1, Tm2 and Tm3 were calculated from the curve.

Tm1: Temperature at an intersection point of a straight line extending a base line of a low temperature side to a high temperature side and a tangent line drawn to the curve of a low temperature side of fusion peak (endothermic peak) at a point that a gradient becomes maximum Tm2: Temperature at an intersection point of a tangent line drawn to the curve of a low temperature side of fusion peak at a point that a gradient becomes maximum, and a tangent line drawn to the curve of a high temperature side of fusion peak at a point that a gradient becomes maximum Tm3: Temperature at an intersection point of a straight line extending a base line of a high temperature side to a low temperature side and a tangent line drawn to the curve of a high temperature side of fusion peak at a point that a gradient becomes maximum However, when a stepwise changing part (that is a part first depressed to an endotherm side from a base line of a low temperature side in the example of FIG. 1) is present in the fusion peak crave as in FIG. 1, Tm1 and Tm3 were calculated such that the temperature is an intersection point of a tangent line drawn at a point that a gradient of the curve in the stepwise changing part becomes maximum and a base line.

Each rubber composition was vulcanized at 159° C. for 30 minutes to obtain a test piece having a predetermined shape, and tear resistance and low heat generation properties of each test piece obtained were measured and evaluated. The measurement and evaluation methods are as follows.

Tear resistance: Using a sample obtained by punching into a crescent shape specified in JIS K6252 and making a cut of 0.50±0.08 mm in the center of depression, a test was conducted in a tensile rate of 500 mm/min by a tensile tester manufactured by Shimadzu Corporation, and tear strength was measured. The value was indicated by an index as the value of Comparative Example 1 being 100. Tear strength is large and tear resistance is excellent as the index is large. When the index is 103 or more, it is considered that the improvement effect of tear resistance is achieved.

Low heat generation properties: Loss factor tan δ was measured under the conditions of frequency: 10 Hz, static strain: 10%, dynamic strain: ±1% and temperature: 60° C. using a viscoelasticity testing machine manufactured by Toyo Seiki Seisaku-Sho. The inverse number of tan δ was indicated by an index as the value of Comparative Example 1 being 100. Tan δ is small and low heat generation properties are excellent as the index is large. This means that rolling resistance as a tire is small and low fuel consumption is excellent. When the index is 101 or more, it is considered that the improvement effect of low heat generation properties is achieved.

TABLE 1

| Formulations (parts by mass) | Comparative Example | | | | | | Example | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Step 1 | | | | | | | | | | | | | |
| Natural rubber | | | 50 | 50 | 50 | 50 | 50 | 50 | 50 | 50 | 50 | 50 | 50 |
| BR1 | | | 50 | 50 | 50 | 50 | 50 | 50 | 50 | 50 | 50 | 50 | 50 |
| Carbon black | | | 50 | 50 | 50 | 50 | 50 | 50 | 50 | 50 | 50 | 50 | 50 |
| Zinc oxide | | | | | 3 | | 3 | 3 | 3 | 3 | 3 | 3 | 3 |
| Compound (I) | | | | | 2 | 2 | 2 | 2 | 2 | 3 | 1 | 2 | 2 |
| Step 2 | | | | | | | | | | | | | |
| Natural rubber | 50 | 50 | | | | | | | | | | | |
| BR1 | 50 | 50 | | | | | | | | | | | |
| Carbon black | 50 | 50 | | | | | | | | | | | |
| Zinc oxide | 3 | 3 | 3 | | 3 | 3 | | | | | | | |
| Wax | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 |
| Compound (I) | | 2 | | | | | | | | | | | |
| Processing aid 1 | | | | | | 3 | | 3 | | 1 | 5 | | |
| Processing aid 2 | | | | | | | | | 3 | | | | |
| Processing aid 3 | | | | | | | | | | | | 3 | |
| Processing aid 4 | | | | | | | | | | | | | 3 |
| Step 3 | | | | | | | | | | | | | |
| Sulfur | 2 | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 | 1 |
| Evaluation (index) | | | | | | | | | | | | | |
| Tear resistance | 100 | 91 | 94 | 96 | 95 | 102 | 105 | 113 | 109 | 106 | 115 | 104 | 103 |
| Low heat generation properties | 100 | 102 | 101 | 101 | 103 | 103 | 104 | 103 | 104 | 106 | 102 | 103 | 101 |

The results are shown in Table 1. Comparing with Comparative Example 1 as a control, Comparative Example 2 was that low heat generation properties were improved by adding the compound (I), but tear resistance was greatly deteriorated. Comparative Examples 3 and 4 were that the diene rubber and carbon black were premixed, but because the compound (I) was not added, low heat generation properties and tear resistance were insufficient. Comparative Example 5 was that the improvement effect of low heat generation properties was excellent by premixing the diene rubber, carbon black and the compound (I), but because zinc oxide was not premixed, the improvement of tear resistance was insufficient. On the other hand, Examples 1 to 7 in which the diene rubber, carbon black, the compound (I) and zinc oxide were premixed were that not only low heat generation properties were improved, but tear resistance was improved. In particular, Examples 2 to 5 in which the fatty acid type processing aid having large difference of endothermic peak (Tm3−Tm1) was added were that fear resistance was remarkably improved.

Second Example

Rubber compositions to be used as a sidewall member were prepared in the same manner as in First Example, except for changing the kind of the diene rubber according to the formulations (parts by mass) shown in Table 2 below. BR2 in Table 2 is as follows, and other components are the same as in First Example.

BR2: SPB-containing BR, "UBEPOL VCR617" (cis content in high cis-BR as matrix=98 mass %, SPB content in SPB-containing BR=17 mass %) manufactured by Ube Industries, Ltd.

Tear resistance and low heat generation properties of each rubber composition obtained were measured and evaluated in the same manners as in First Example. However, Second Example was indicated by an index as Comparative Example 9 being a control. The results are shown in Table 2. Similar to First Example, not only low heat generation properties were improved but tear resistance was improved, by premixing the diene rubber, carbon black, the compound (I) and zinc oxide.

TABLE 2

| Formulations (parts by mass) | Comparative Example | | | | | Example | | |
|---|---|---|---|---|---|---|---|---|
| | 7 | 8 | 9 | 10 | 11 | 8 | 9 | 10 |
| Step 1 | | | | | | | | |
| Natural rubber | | | 50 | 50 | 50 | 50 | 50 | 50 |
| BR1 | | | 30 | 30 | 30 | 30 | 30 | 30 |
| BR2 | | | 20 | 20 | 20 | 20 | 20 | 20 |
| Carbon black | | | 50 | 50 | 50 | 50 | 50 | 50 |
| Zinc oxide | | | | 3 | | 3 | 3 | 3 |
| Compound (I) | | | | | 2 | 2 | 2 | 2 |
| Step 2 | | | | | | | | |
| Natural rubber | 50 | 50 | | | | | | |
| BR1 | 30 | 30 | | | | | | |
| BR2 | 20 | 20 | | | | | | |
| Carbon black | 50 | 50 | | | | | | |
| Zinc oxide | 3 | 3 | 3 | | 3 | | | |
| Wax | 2 | 2 | 2 | 2 | 2 | 2 | 2 | 2 |
| Stearic acid | 2 | 2 | 2 | 2 | 2 | 2 | 2 | 2 |
| Compound (I) | | 2 | | | | | | |
| Processing aid 1 | | | | | | | 3 | |
| Processing aid 2 | | | | | | | | 3 |
| Step 3 | | | | | | | | |
| Sulfur | 2 | 2 | 2 | 2 | 2 | 2 | 2 | 2 |
| Vulcanization accelerator | 1 | 1 | 1 | 1 | 1 | 1 | 1 | 1 |
| Evaluation | | | | | | | | |

TABLE 2-continued

| Formulations | Comparative Example | | | | | Example | | |
|---|---|---|---|---|---|---|---|---|
| (parts by mass) | 7 | 8 | 9 | 10 | 11 | 8 | 9 | 10 |
| (index) | | | | | | | | |
| Tear resistance | 100 | 94 | 95 | 96 | 95 | 106 | 110 | 109 |
| Low heat generation properties | 100 | 102 | 100 | 101 | 102 | 105 | 104 | 105 |

The invention claimed is:

1. A method for producing a tire sidewall rubber member, comprising:
 a first kneading step of preparing a first kneaded product by kneading a diene rubber, carbon black, a compound represented by the following formula (I) and zinc oxide, and
 a second kneading step of adding wax and/or stearic acid to the first kneaded product, followed by kneading:

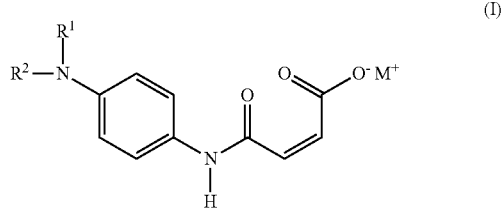

(I)

wherein $R^1$ and $R^2$ represent a hydrogen atom, an alkyl group having 1 to 20 carbon atoms, an alkenyl group having 1 to 20 carbon atoms or an alkynyl group having 1 to 20 carbon atoms, $R^1$ and $R^2$ may be the same or different, and W represents a sodium ion, a potassium ion or a lithium ion, and
 wherein a processing aid comprising at least one selected from the group consisting of a fatty acid metal salt, a fatty acid amide and a fatty acid ester, and having a difference (Tm3−Tm1) between a start point (Tm1) and an end point (Tm3) of an endothermic peak measured by a differential scanning calorimeter of 50° C. or more is added in the second kneading step.

2. The method for producing a tire sidewall rubber member according to claim 1, wherein the processing aid is a mixture of a fatty acid metal salt, and a fatty acid amide and/or a fatty acid ester.

3. The method for producing a tire sidewall rubber member according to claim 1, wherein 100 parts by mass of the diene rubber, 20 to 80 parts by mass of the carbon black, 0.1 to 10 parts by mass of the compound of the formula (I) and 1 to 10 parts by mass of zinc oxide are kneaded in the first kneading step.

4. The method for producing a tire sidewall rubber member according to claim 1, wherein 100 parts by mass of the diene rubber contain 30 to 80 parts by mass of natural rubber and/or isoprene rubber and 70 to 20 parts by mass of butadiene rubber.

5. The method for producing a tire sidewall rubber member according to claim 1, wherein 100 parts by mass of the diene rubber contain 40 to 70 parts by mass of natural rubber and/or isoprene rubber, 20 to 40 parts by mass of high cis-butadiene rubber having a cis content of 90 mass % or more and 10 to 30 parts by mass of syndiotactic crystal-containing butadiene rubber.

6. The method for producing a tire sidewall rubber member according to claim 1, further comprising a step of adding a vulcanizing agent to the kneaded product obtained in the second kneading step, followed by kneading, to prepare a rubber composition and a step of molding an unvulcanized sidewall rubber member using the rubber composition.

7. A method for producing a pneumatic tire, comprising manufacturing a green tire having a sidewall rubber member obtained by the production method according to claim 1, and vulcanization-molding the green tire.

* * * * *

UNITED STATES PATENT AND TRADEMARK OFFICE
CERTIFICATE OF CORRECTION

PATENT NO. : 10,913,838 B2
APPLICATION NO. : 16/330949
DATED : February 9, 2021
INVENTOR(S) : Akie Kurihara Page 1 of 1

It is certified that error appears in the above-identified patent and that said Letters Patent is hereby corrected as shown below:

In the Claims

Change Column 15, Line 37:
different, and W represent a sodium ion, a potassium
To Be:
different, and M+ represent a sodium ion, a potassium Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*